United States Patent
Jiang

(10) Patent No.: US 10,299,220 B2
(45) Date of Patent: May 21, 2019

(54) DETERMINING DATA TRANSMIT POWER BASED ON ESTIMATED SIGNAL ATTENUATION

(71) Applicant: ZTE CORPORATION, Shenzhen (CN)

(72) Inventor: Anming Jiang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/556,061

(22) PCT Filed: Mar. 4, 2016

(86) PCT No.: PCT/CN2016/075652
§ 371 (c)(1),
(2) Date: Sep. 6, 2017

(87) PCT Pub. No.: WO2016/141858
PCT Pub. Date: Sep. 15, 2016

(65) Prior Publication Data
US 2018/0049136 A1    Feb. 15, 2018

(30) Foreign Application Priority Data
Mar. 6, 2015    (CN) .......................... 2015 1 0100010

(51) Int. Cl.
*H04W 52/24*    (2009.01)
*H04W 52/38*    (2009.01)

(52) U.S. Cl.
CPC ......... *H04W 52/24* (2013.01); *H04W 52/243* (2013.01); *H04W 52/38* (2013.01); *H04W 52/383* (2013.01)

(58) Field of Classification Search
CPC . H04W 52/243; H04W 52/383; H04W 52/04; H04W 52/24; H04W 52/242;
(Continued)

(56) References Cited

U.S. PATENT DOCUMENTS

2014/0233476 A1* 8/2014 Kwak ................ H04W 52/367
370/329
2014/0254401 A1 9/2014 Talwar et al.
(Continued)

FOREIGN PATENT DOCUMENTS

| CN | 1684441 A | 10/2005 |
|---|---|---|
| CN | 103326838 A | 9/2013 |

(Continued)

OTHER PUBLICATIONS

International Search Report for PCT/CN2016/075652, English Translation attached to original, Both completed by the Chinese Patent Office dated Apr. 6, 2016, All together 5 Pages.
(Continued)

*Primary Examiner* — Philip Sobutka
(74) *Attorney, Agent, or Firm* — Plumsea Law Group, LLC

(57) ABSTRACT

A method and apparatus for transmitting data are provided. The method includes: when detecting that there is a wireless frame currently being transmitted on a working channel, the first sender estimates a signal attenuation between the first sender and a first receiver for the wireless frame currently being transmitted to obtain an estimation result, and determines a transmitting power of the first sender according to the estimation result; and the first sender sends a wireless frame to a second receiver with the determined transmitting power.

9 Claims, 4 Drawing Sheets

(58) Field of Classification Search
CPC ........... H04W 52/367; H04W 72/0473; H04W 72/082; H04W 24/02; H04W 52/18; H04W 52/241; H04W 52/245; H04W 52/362; H04W 52/38
USPC ......................................................... 455/522
See application file for complete search history.

(56) References Cited

U.S. PATENT DOCUMENTS

| | | |
|---|---|---|
| 2015/0063336 A1 | 3/2015 | Cherian et al. |
| 2016/0037530 A1 | 2/2016 | Peng et al. |
| 2016/0081100 A1 | 3/2016 | Du et al. |

FOREIGN PATENT DOCUMENTS

| | | |
|---|---|---|
| CN | 103918346 A | 7/2014 |
| CN | 104105181 A | 10/2014 |
| CN | 104105185 | 10/2014 |
| CN | 104184702 | 12/2014 |
| EP | 2768262 A1 | 8/2014 |

OTHER PUBLICATIONS

Extended European Search Report dated Dec. 1, 2017 for European Patent Application No. 16761085.6.
Chinese Office Action dated Oct. 8, 2018 for CN Application No. 201510100010.7.

* cited by examiner

DETERMINING DATA TRANSMIT POWER BASED ON ESTIMATED SIGNAL ATTENUATION

CROSS-REFERENCE TO RELATED APPLICATION

This application is the U.S. national phase of PCT Application No. PCT/CN2016/075652 filed Mar. 4, 2016, which claims priority to Chinese Application No. 201510100010.7 filed Mar. 6, 2015, the disclosures of which are incorporated in their entirety by reference herein.

TECHNICAL FIELD

The present disclosure relates to, but is not limited to, computer network technologies and wireless communication technologies, and in particular, to a method and apparatus for transmitting data.

BACKGROUND

At present, using wireless local area networks (WLANs) for data communication has been become very common, and requirements for WLAN coverage in the whole world increase constantly. A series of standards, such as 802.11a/b/g/n/ac, are defined successively by a group of industry specifications IEEE802.11 of the Institute of Electrical and Electronics Engineers to satisfy ever-increasing communication requirements. FIG. 1 is a schematic diagram of a constitution structure of a basic service set (BSS). As shown in FIG. 1, in a common WLAN network, one BSS may be composed of one access point (AP) station (STA) and a plurality of non-AP STAs associated with it. At present, the IEEE802.11 supports two clear channel determine methods, i.e., physical carrier detection and virtual carrier detection. Only when the channel is determined to be clear by using both the physical carrier detection and the virtual carrier detection, the STA can perform competitive sending. Herein, the physical carrier detection means a clear channel assessment (CCA) channel detection technology, that is, the STA determines whether the channel is busy or clear by detecting the strength of signals on media and in conjunction with a CCA threshold value. The virtual carrier detection means that a third party STA except two communication parties sets a value of a local network allocation vector (NAV) according to a value of a duration domain in the wireless frame when receiving a wireless frame, a receiver address of which is not the address of the third party STA. The NAV is a counter, and when the NAV is not zero, it is considered that the channel is busy and the competitive sending will not be performed. Only when the channel is determined to be clear by using both the physical carrier detection and the virtual carrier detection, the STA can compete to access channel for sending.

As devices in the WLAN increase gradually, to increase channel access opportunities, multiplexing transmission is allowed on the same working channel at the same time. FIG. 2 is a schematic diagram of multiplexing transmission. As shown in FIG. 2, a STA A communicates with a STA B. If a STA C can receive signals from the STA B and cannot receive signals from the STA A, then it is considered that the STA C will not interfere with data receiving of the STA A from the STA B. Therefore, the STA C transmits data to a STA D with the same frequency band resources during duration time of the wireless frame currently being transmitted, i.e., while the STA B is communicating with the STA A, to improve network throughput.

However, in actual environments, transmitting powers of the transmitting stations are different, and inequality of the powers between the transmitting stations will cause asymmetry of the coverage area. A problem that the above process faces is that if the STA C communicates with the STA D with higher transmitting power, communication between the STA B and the STA A will be interfered. FIG. 3 is a schematic diagram of high power multiplexing transmission. As shown in FIG. 3, since too high transmitting power of the STA C interferes seriously with data receiving of the STA A, the STA A fails to receive the data. In the existing art, there is no efficient solution yet to such interference caused by the inequality of the transmitting powers.

SUMMARY

The following is a summary of the subject matter described herein in detail. This summary is not intended to limit the protection scope of the claims.

Embodiments of the present disclosure provide a method and apparatus for transmitting data to decrease interference caused by inequality of transmitting powers during multiplexing transmission.

Specifically, an embodiment of the present disclosure provides a method for transmitting data. The method includes:

when detecting that there is a wireless frame currently being transmitted on a working channel, estimating, by a first sender, a signal attenuation between the first sender and a first receiver for the wireless frame currently being transmitted to obtain an estimation result, and determining a transmitting power of the first sender according to the estimation result; and sending, the first sender, a wireless frame to a second receiver with the determined transmitting power.

In an exemplary embodiment, after the first sender detects that there is the wireless frame currently being transmitted on the working channel and before the first sender estimates the signal attenuation between the first sender and the first receiver for the wireless frame currently being transmitted to obtain the estimation result, the method further includes:

determining, by the first sender, that the wireless frame currently being transmitted is not transmitted between stations in a basic service set (BSS) in which the first sender is located.

In an exemplary embodiment, estimating a signal attenuation between the first sender and a first receiver for the wireless frame currently being transmitted to obtain an estimation result includes:

determining, by the first sender, that the first sender can receive a wireless frame sent by the first receiver and can know a transmitting power of the first receiver and a preset threshold;

herein the preset threshold is an acceptable interference power of the first receiver, and the first sender obtains the acceptable interference power of the first receiver from the wireless frame sent by the first receiver, and determining a transmitting power of the first sender according to the estimation result includes:

determining that the transmitting power of the first sender is less than or equal to a transmitting power corresponding to a sum of the preset threshold and a path loss; herein the path loss is a difference value between the transmitting power of the first receiver and a received power of the received wireless frame sent by the first receiver, and the first sender obtains the transmitting power of the first receiver from the wireless frame sent by the first receiver.

In an exemplary embodiment, estimating a signal attenuation between the first sender and a first receiver for the wireless frame currently being transmitted to obtain an estimation result includes:

determining, by the first sender, that the first sender cannot receive the wireless frame sent by the first receiver but can know a transmitting power of the first receiver; and the determining a transmitting power of the first sender according to the estimation result includes:

obtaining, by the first sender, the transmitting power of the first receiver and determining the transmitting power of the first sender to be a first transmitting power or a second transmitting power;

herein the first transmitting power is the transmitting power of the first receiver, and the second transmitting power is less than the first transmitting power.

In an exemplary embodiment, obtaining, by the first sender, the transmitting power of the first receiver includes:

detecting, by the first sender, a wireless frame sent by a second sender for the wireless frame currently being transmitted, and obtaining the transmitting power of the first receiver according to the wireless frame sent by the second sender.

In an exemplary embodiment, the wireless frame sent by the second sender carries the transmitting power of the first receiver; and obtaining the transmitting power of the first receiver according to the wireless frame sent by the second sender includes:

obtaining the transmitting power of the first receiver from the wireless frame sent by the second sender.

In an exemplary embodiment, the wireless frame sent by the second sender carries identification information of the first receiver; and obtaining the transmitting power of the first receiver according to the wireless frame sent by the second sender includes:

obtaining the identification information of the first receiver from the wireless frame sent by the second sender, and searching a surrounding station information list of the first sender for a transmitting power corresponding to the obtained identification information of the first receiver.

In an exemplary embodiment, estimating a signal attenuation between the first sender and a first receiver for the wireless frame currently being transmitted to obtain an estimation result includes:

determining, by the first sender, that the first sender cannot receive a wireless frame sent by the first receiver and cannot know a transmitting power of the first receiver; and determining a transmitting power of the first sender according to the estimation result includes:

determining the transmitting power of the first sender to be a preset transmitting power.

In an exemplary embodiment, estimating a signal attenuation between the first sender and the first receiver for the wireless frame currently being transmitted to obtain an estimation result includes:

determining, by the first sender, that the first sender can receive a wireless frame sent by the first receiver but cannot know a transmitting power of the first receiver; and ending the process.

In an exemplary embodiment, time for which the first sender sends a wireless frame to the second receiver does not exceed the duration time of the wireless frame currently being transmitted.

In an exemplary embodiment, after the first sender adjusts the transmitting power of the first sender according to a level of the transmitting power of the first receiver for the wireless frame currently being transmitted and before the first sender transmits data to the second receiver during the duration time of the wireless frame currently being transmitted with the adjusted transmitting power of the first sender, the method further includes:

sending, by the first sender, a request frame to the second receiver with the determined transmitting power; and receiving a response frame from the second receiver.

An embodiment of the present disclosure further provides a computer readable storage medium where computer executable instructions are stored, and when executed by a computer, the computer executable instructions can implement the method described above.

An embodiment of the present disclosure provides an apparatus for transmitting data including a determination module and a sending module.

The determination module is configured to, when detecting that there is a wireless frame currently being transmitted on a working channel, estimate a signal attenuation between the apparatus and a first receiver for the wireless frame currently being transmitted to obtain an estimation result, and determine a transmitting power of the apparatus according to the estimation result; and The sending module is configured to send a wireless frame to a second receiver with the determined transmitting power.

In an exemplary embodiment, the determination module is configured to, when detecting that there is the wireless frame currently being transmitted on the working channel, determine that the wireless frame currently being transmitted is not transmitted between stations in a basic service set (BSS) in which the first sender is located, estimate the signal attenuation between the apparatus and the first receiver for the wireless frame currently being transmitted to obtain the estimation result, and determine the transmitting power of the apparatus according to the estimation result.

In an exemplary embodiment, the determination module is configured to:

when detecting that there is the wireless frame currently being transmitted on the working channel, determine that the apparatus can receive a wireless frame sent by the first receiver and can know a transmitting power of the first receiver and a preset threshold, and determine that the transmitting power of the apparatus is less than or equal to a transmitting power corresponding to a sum of the preset threshold and a path loss;

herein the preset threshold is an acceptable interference power of the first receiver, and the first sender obtains the acceptable interference power of the first receiver from the wireless frames sent by the first receiver;

herein the path loss is a difference value between the transmitting power of the first receiver and a received power of the received wireless frame sent by the first receiver, and the first sender obtains the transmitting power of the first receiver from the wireless frame sent by the first receiver.

In an exemplary embodiment, the determination module is configured to, when detecting that there is the wireless frame currently being transmitted on the working channel, determine that the apparatus cannot receive the wireless frame sent by the first receiver but can know a transmitting power of the first receiver; obtain the transmitting power of the first receiver and determine the transmitting power of the apparatus to be a first transmitting power or a second transmitting power;

herein the first transmitting power is the transmitting power of the first receiver, and the second transmitting power is less than the first transmitting power.

In an exemplary embodiment, the determination module is configured to, when detecting that there is the wireless frame currently being transmitted on the working channel, determine that the apparatus cannot receive the wireless frame sent by the first receiver but can know the transmitting power of the first receiver; detect a wireless frame sent by a second sender for the wireless frame currently being transmitted, and obtain the transmitting power of the first receiver from the wireless frame sent by the second sender and determine the transmitting power of the apparatus to be the first transmitting power or the second transmitting power;

herein the first transmitting power is the transmitting power of the first receiver, and the second transmitting power is less than the first transmitting power.

In an exemplary embodiment, the determination module is configured to, when detecting that there is the wireless frame currently being transmitted on the working channel, determine that the apparatus cannot receive the wireless frame sent by the first receiver but can know the transmitting power of the first receiver, detect the wireless frame sent by the second sender for the wireless frame currently being transmitted, and obtain the transmitting power of the first receiver from the wireless frame sent by the second sender and determine the transmitting power of the apparatus to be the first transmitting power or the second transmitting power;

herein the wireless frame sent by the second sender carries the transmitting power of the first sender, and the first transmitting power is the transmitting power of the first receiver, and the second transmitting power is less than the first transmitting power.

In an exemplary embodiment, the determination module is configured to, when detecting that there is the wireless frame currently being transmitted on the working channel, determine that the apparatus cannot receive the wireless frame sent by the first receiver but can know the transmitting power of the first receiver, detect the wireless frame sent by the second sender for the wireless frame currently being transmitted, obtain identification information of the first receiver from the wireless frame sent by the second sender, search a surrounding station information list of the apparatus for a transmitting power corresponding to the obtained identification information of the first receiver, and determine the transmitting power of the apparatus to be the first transmitting power or the second transmitting power;

herein the wireless frame sent by the second sender carries the identification information of the first receiver, and the first transmitting power is the transmitting power of the first receiver, and the second transmitting power is less than the first transmitting power.

In an exemplary embodiment, the determination module is configured to, when detecting that there is the wireless frame currently being transmitted on the working channel, determine that the apparatus cannot receive the wireless frame sent by the first receiver and cannot know the transmitting power of the first receiver, and determine the transmitting power of the apparatus to be a preset transmitting power.

In an exemplary embodiment, the sending module is configured to, send a request frame to the second receiver with the determined transmitting power, and receive a response frame from the second receiver, and transmit data to the second receiver during duration time of the wireless frame currently being transmitted with the determined transmitting power.

Compared to the existing art, in the scheme of the embodiments of the present disclosure, when detecting that there is a wireless frame currently being transmitted on a working channel, the first sender estimates a signal attenuation between the first sender and a first receiver for the wireless frame currently being transmitted to obtain an estimation result, and determine the transmitting power of the first sender according to the estimation result; and the first sender sends the wireless frame to a second receiver with the determined transmitting power. Through the scheme of the embodiments of the present disclosure, the first sender determines the transmitting power of the first sender according to the estimation result, decreasing interference caused by inequality of transmitting powers during multiplexing transmission.

After the accompanying drawings and the detailed description are read and understood, other aspects can be understood.

BRIEF DESCRIPTION OF DRAWINGS

The accompanying drawings in embodiments of the present disclosure will be described below. The accompanying drawings in the embodiments are intended to provide a further understanding of the present disclosure and explain the present disclosure together with the description, and do not limit the protection scope of the present disclosure.

DETAILED DESCRIPTION

Embodiments of the present disclosure will be described in detail below in conjunction with the accompanying drawings. It should be noted that the embodiments in the present disclosure and various manners in the embodiments can be combined with each other without conflict.

Figure 1:
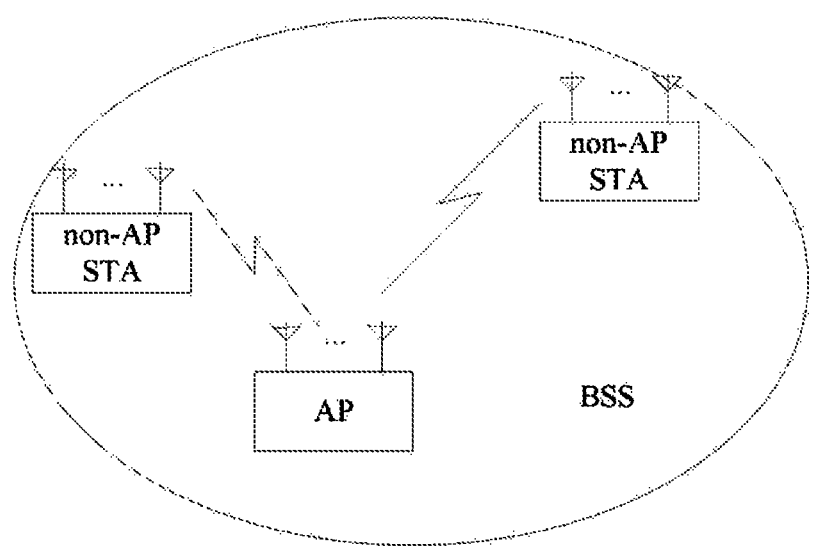
FIG. 1 is a schematic diagram of a constitution structure of an existing basic service set (BSS).
Figure 2:
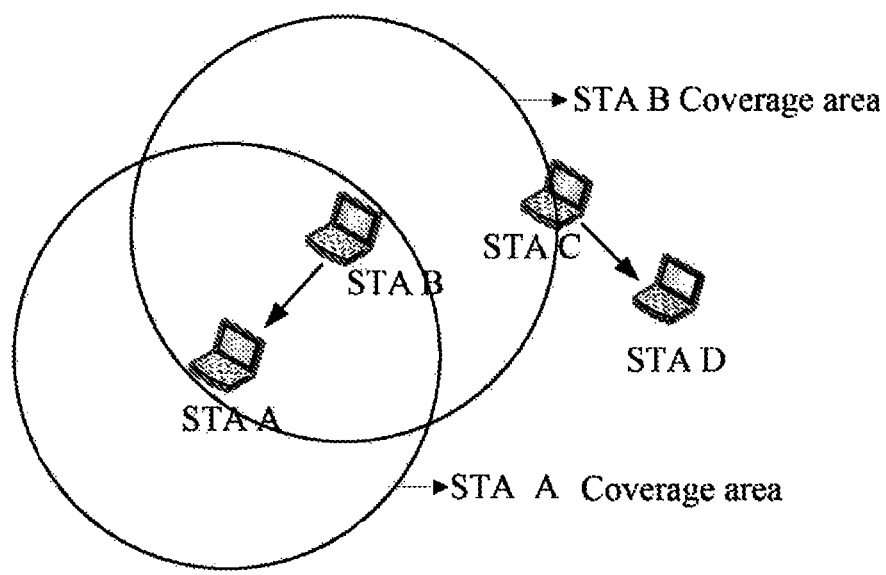
FIG. 2 is a schematic diagram of existing multiplexing transmission.
Figure 3:
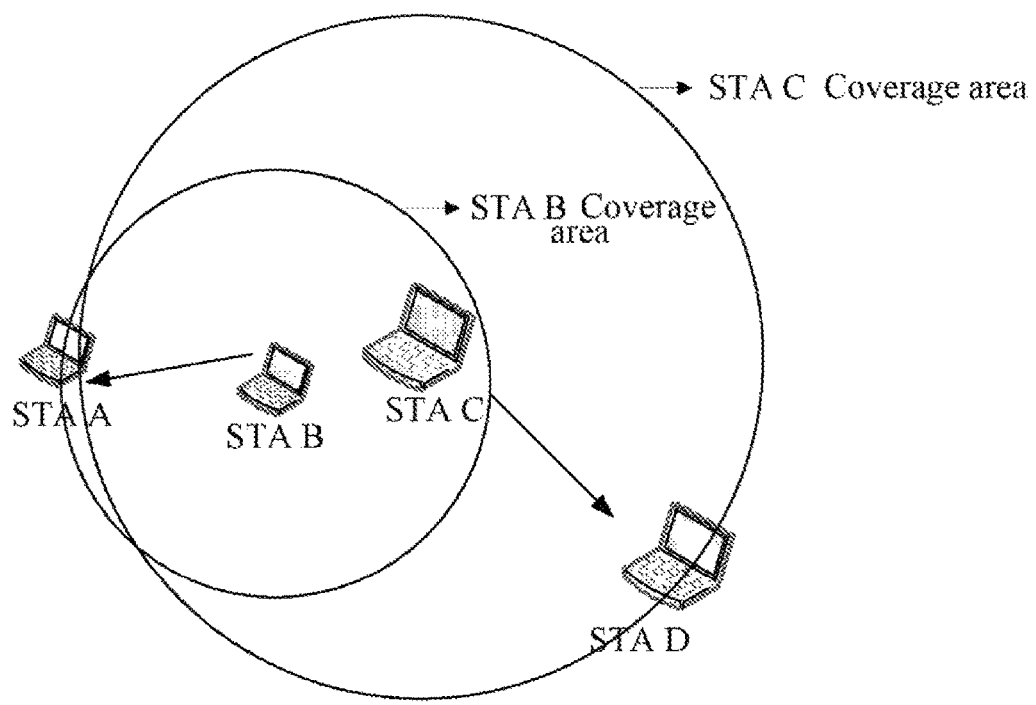
FIG. 3 is a schematic diagram of existing high power multiplexing transmission.
Figure 4:
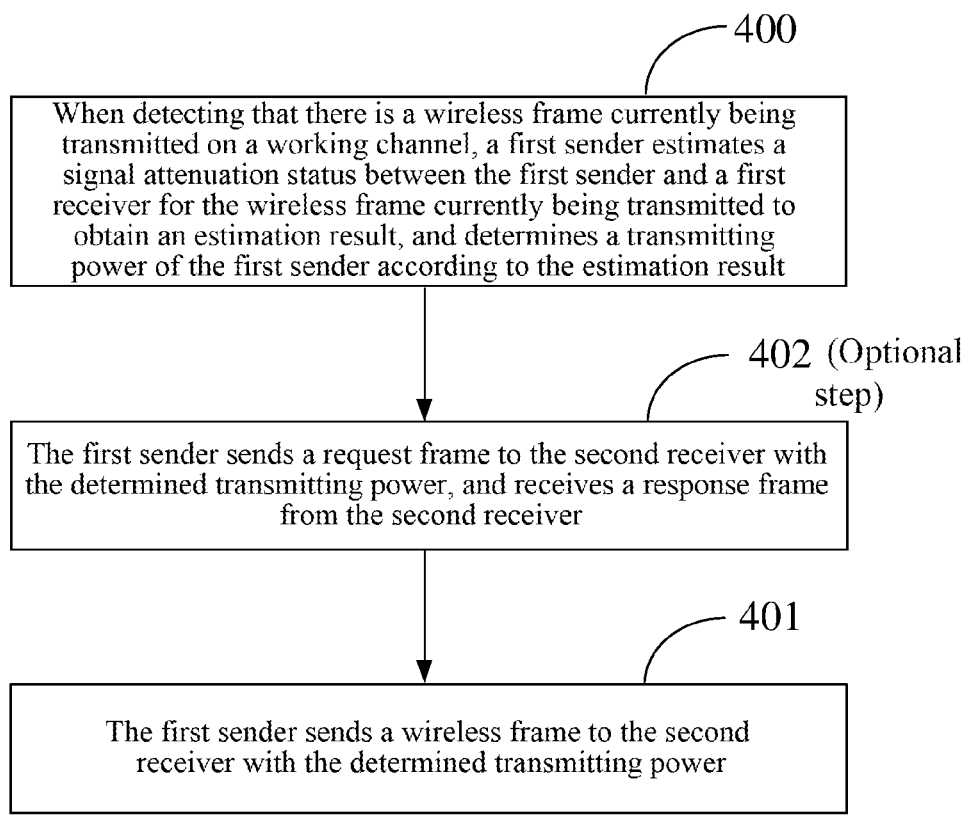
FIG. 4 is a flow chart of a method for transmitting data in accordance with an embodiment of the present disclosure.

Referring to FIG. 4, an embodiment of the present disclosure provides a method for transmitting data including the following steps 400-402.

In step 400, when detecting that there is a wireless frame currently being transmitted on a working channel, a first sender estimates a signal attenuation between the first sender and a first receiver for the wireless frame currently being transmitted to obtain an estimation result, and determines a transmitting power of the first sender according to the estimation result.

In this step, after the first sender detects that there is the wireless frame currently being transmitted on the working channel and before the first sender estimates the signal attenuation between the first sender and the first receiver for the wireless frame currently being transmitted to obtain the estimation result, the method may further include: the first sender determines that the wireless frame currently being transmitted is not transmission between stations in a BSS in which the first sender is located.

In this step, after the first sender detects that there is data currently being transmitted on the working channel and before the first sender adjusts its own transmitting power according to a level of a transmitting power of the first receiver for the wireless frame currently being transmitted, if the first sender determines that the first sender and a second sender for the wireless frame currently being transmitted, or the first receiver and a second receiver, or the first sender and the first receiver, or the second sender and the second receiver are APs in the same BSS, then the process ends.

In this step, after the first sender detects that there is data currently being transmitted on the working channel and before the first sender adjusts its own transmitting power according to the level of the transmitting power of the first receiver for the wireless frame currently being transmitted, if the first sender determines that the currently transmitted data cannot be recognized, the process is processed according to the existing method.

The first sender can determine whether the currently transmitted data can be recognized by using methods known in the art, which will not be repeated herein.

In an exemplary embodiment, in this step, estimating the signal attenuation between the first sender and the first receiver for the wireless frame currently being transmitted to obtain the estimation result includes:

the first sender determines that the first sender itself can receive the wireless frame sent by the first receiver and can know the transmitting power of the first receiver and a preset threshold.

Herein, the preset threshold is an acceptable interference power of the first receiver, and the first sender obtains the acceptable interference power of the first receiver from the wireless frame sent by the first receiver.

Determining a transmitting power of the first sender according to the estimation result includes:

It is determined that the transmitting power of the first sender is less than or equal to a transmitting power corresponding to a sum of the preset threshold and a path loss.

Herein, the path loss is a difference value between the transmitting power of the first receiver and a received power of the received wireless frame sent by the first receiver, and the first sender obtains the transmitting power of the first receiver from the wireless frame sent by the first receiver.

The first sender can obtain identification information (such as address information, identity information, and the like) of the first receiver from the currently transmitted wireless frame, and determine whether the first sender can receive the wireless frame sent by the first receiver according to the obtained identification information of the first receiver and a surrounding station information list of the first sender. For example, the identification information of the first receiver is searched for in the surrounding station information list of the first sender. If the identification information is found, then the first sender determines that it can receive the wireless frame sent by the first receiver; and if the identification information is not found, then the first sender determines that it cannot receive the wireless frame sent by the first receiver.

In an exemplary embodiment, in this step, estimating the signal attenuation between the first sender and the first receiver for the wireless frame currently being transmitted to obtain the estimation result includes:

the first sender determines that the first sender itself cannot receive the wireless frame sent by the first receiver but can know the transmitting power of the first receiver.

Determining a transmitting power of the first sender according to the estimation result includes:

the first sender obtains the transmitting power of the first receiver and determines its own transmitting power to be a first transmitting power or a second transmitting power;

herein the first transmitting power is the transmitting power of the first receiver, and the second transmitting power is less than the first transmitting power.

That the first sender obtains the transmitting power of the first receiver includes:

the first sender detects a wireless frame sent by a second sender for the wireless frame currently being transmitted, and obtains the transmitting power of the first receiver according to the wireless frame sent by the second sender.

In an exemplary embodiment, the wireless frame sent by the second sender carries the transmitting power of the first sender; and obtaining the transmitting power of the first receiver according to the wireless frame sent by the second sender includes:

the transmitting power of the first receiver is obtained from the wireless frame sent by the second sender.

In an exemplary embodiment, the wireless frame sent by the second sender carries the identification information of the first receiver; and obtaining the transmitting power of the first receiver according to the wireless frame sent by the second sender includes:

the identification information of the first receiver is obtained from the wireless frame sent by the second sender, and the transmitting power corresponding to the obtained identification information of the first receiver is searched in a surrounding station information list of the first sender.

In an exemplary embodiment, in this step, estimating the signal attenuation between the first sender and the first receiver for the wireless frame currently being transmitted to obtain the estimation result includes:

the first sender determines that the first sender cannot receive the wireless frame sent by the first receiver and cannot know the transmitting power of the first receiver.

Determining a transmitting power of the first sender according to the estimation result includes:

the transmitting power of the first sender is determined to be a preset transmitting power.

The preset transmitting power may be a minimum transmitting power of the current communication system.

In an exemplary embodiment, in this step, estimating the signal attenuation between the first sender and the first receiver for the wireless frame currently being transmitted to obtain the estimation result includes:

the first sender determines that the first sender can receive the wireless frame sent by the first receiver but cannot know the transmitting power of the first receiver; and the process of the present disclosure ends.

After the ending of the process of present disclosure, what may further be performed is that the first sender sets an NAV according to the currently transmitted wireless frame.

In step 401, the first sender sends the wireless frame to the second receiver with the determined transmitting power.

In this step, time for which the first sender sends the wireless frame to the second receiver does not exceed duration time of the wireless frame currently being transmitted.

The duration time of the wireless frame currently being transmitted may be obtained from the detected wireless frame of the second sender, and the obtained manner may adopt a manner known in the art, which will not repeated herein.

Between step 400 and step 401, the method may further include the step 402.

In step 402, the first sender sends a request frame to the second receiver with the determined transmitting power, and receives a response frame from the second receiver.

The method of the embodiments of the present disclosure will be described in detail through specific examples.

A first example: a process in which stations cannot know the level of the transmitting power of the first receiver for the wireless frame currently being transmitted is described in this example.

Figure 5:
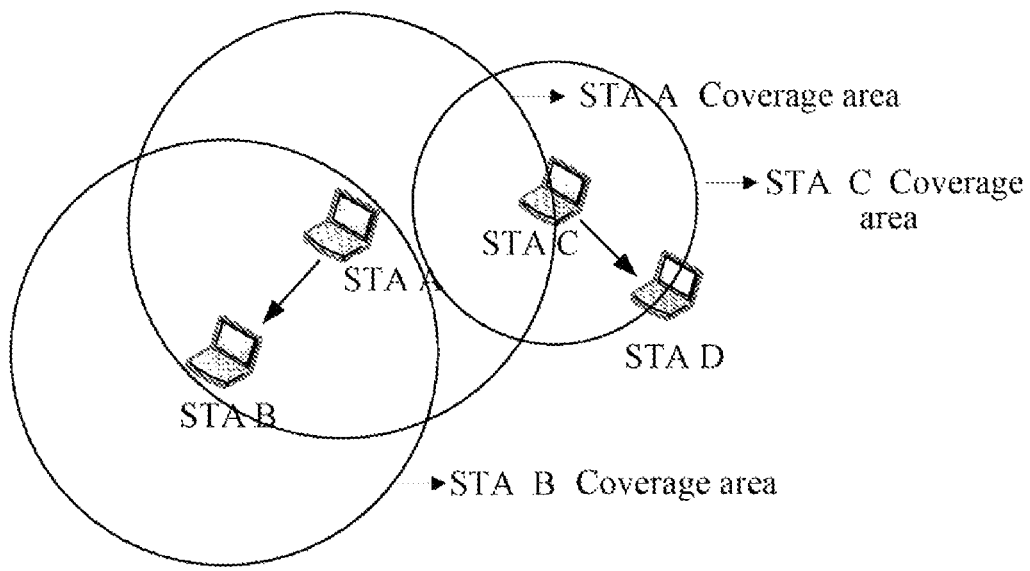
FIG. 5 is a schematic diagram of multiplexing transmission in accordance with a first example of an embodiment of the present disclosure.

FIG. 5 is a schematic diagram of multiplexing transmission in this example. As shown in FIG. 5, a STA A communicates with a STA B. If a STA C can receive a wireless frame 1, i.e., a first wireless frame, sent by the STA A but cannot receive a wireless frame 2, i.e., a feedback wireless frame, replied by the STA B, then it is considered that the STA C is outside of the signal range of the STA B. Then the STA A sends data DATA1, i.e., a second wireless frame, to the STA B, and the STA C has data DATA2 to be sent, which will be transmitted to a STA D, and the STA C begins to send DATA2 to the STA D after parsing out the transmission duration of DATA1. Since the STA C does not know a transmitting power of the STA B, the STA C adjusts its own transmitting power to be a preset transmitting power when communicating with the STA D, and end time of the communication with the STA D does not exceed end time of the transmission of DATA1.

To confirm that the STA D can receive correctly the wireless frame of the STA C, the STA C sends a request frame to the STA D with the adjusted transmitting power before sending DATA2, and send DATA2 to the STA D only after receiving a response frame of the STA D.

If the transmitting power of the STA C is nonadjustable, then the STA C will not perform multiplexing transmission.

A second example: The STA A communicates with the STA B. If the STA C can receive the wireless frame 1, i.e., the first wireless frame, sent by the STA A but cannot receive the wireless frame 2, i.e., the feedback wireless frame, replied by the STA B, then the STA A sends the data DATA1, i.e., the second wireless frame, to the STA B, and the STA C has data DATA2 to be sent, which will be transmitted to the STA D, and the second wireless frame sent by the STA A carries the transmitting power of the STA B. The STA C knows the transmitting power of the STA B by parsing the second wireless frame sent by the STA A, adjusts its own transmitting power to be the transmitting power of the STA B or lower than the transmitting power of the STA B, and begins to send DATA2 to the STA D after parsing out the transmission duration of DATA1, and the end time of the communication does not exceed the end time of the transmission of DATA1.

A third example: The STA A communicates with the STA B. The STA C can receive the wireless frame 1, i.e., the first wireless frame, sent by the STA A, and can also receive the wireless frame 2, i.e., the feedback wireless frame, replied by the STA B, and the feedback wireless frame sent by the STA B carries the transmitting power of the STA B and an acceptable interference threshold. The STA C knows the transmitting power of the STA B and the acceptable interference threshold by parsing the feedback wireless frame sent by the STA B, and calculates a path loss according to a power of the received feedback wireless frame sent by the STA B, and adjusts its own transmitting power based on the calculated path loss to ensure that a power of signals reaching the STA B when the STA C transmits the data to the STA D is lower than the acceptable interference threshold of the STA B without affecting normal communication of the STA B. Then the STA A sends the data DATA1, i.e., the second wireless frame, to the STA B, and the STA C has the data DATA2 to be sent, which will be transmitted to the STA D, and begins to send DATA2 to the STA D with the adjusted transmitting power after parsing out the transmission duration of DATA1, and the end time of the communication does not exceed the end time of the transmission of DATA1.

A fourth example: The STA A transmits DATA1 to the STA B. The STA C can receive the wireless frame sent by the STA A, and obtain address information of the first receiver, i.e., the STA B, from the wireless frame sent by the STA A, and search for the recorded address information of the STA B in a surrounding station information list of the STA C. If the STA B is not in the surrounding station information list of the STA C, then the STA C will adjust its own transmitting power to be a preset transmitting power when communicating with the STA D. The end time of the communication with the STA D does not exceed the end time of the transmission of DATA1. If the STA B is in the surrounding station information list of the STA C, then the STA C knows the path loss according to the recorded transmitting power of the STA B and receiving power, and adjusts its own transmitting power in conjunction with the recorded acceptable interference power of the STA B to ensure that the power of the signals reaching the STA B when the STA C transmits the data to the STA D is lower than the acceptable interference threshold of the STA B without affecting the normal communication of the STA B. The STA C begins to send DATA2 to the STA D with the adjusted transmitting power after parsing out the transmission duration of DATA1, and the end time of the communication does not exceed the end time of the transmission of DATA1.

For the surrounding station information list, a station monitors and parses the wireless frames, and record sender information of the monitored wireless frames in the surrounding station information list. The surrounding station information list includes one or more of the following parameters: address information of a sender of the monitored wireless frame, a level of transmitting power of a sender of the monitored wireless frame, an arrival power of the monitored wireless frame when arriving to the station, an acceptable interference threshold of the sender of the monitored wireless frame, etc. There is a one-to-one correspondence relationship between these parameters and the address information of the sender of the monitored wireless frame.

An embodiment of the present disclosure further proposes a computer readable storage medium where computer executable instructions are stored, and when executed by a computer, the computer executable instructions can implement the method described above.

Figure 6:
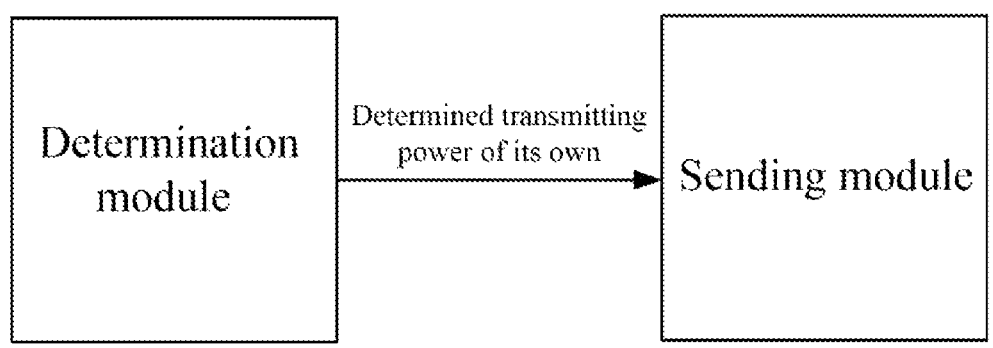
FIG. 6 is a block diagram of an apparatus for transmitting data in accordance with an embodiment of the present disclosure.

Referring to FIG. 6, an embodiment of the present disclosure further proposes an apparatus for transmitting data including a determination module and a sending module.

The determination module is configured to detect that there is a wireless frame currently being transmitted on a working channel, estimate a signal attenuation between the apparatus and a first receiver for the wireless frame currently being transmitted to obtain an estimation result, and determine a transmitting power of the apparatus according to the estimation result.

The sending module is configured to send the wireless frame to a second receiver with the determined transmitting power.

In the above apparatus, the determination module may be configured to, when detecting that there is the wireless frame currently being transmitted on the working channel, determine that the wireless frame currently being transmitted is not transmitted between stations in a basic service set (BSS) in which the first sender is located, and estimate the signal attenuation between the apparatus and the first receiver for the wireless frame currently being transmitted to obtain the estimation result, and determine the transmitting power of the apparatus according to the estimation result.

In the above apparatus, the determination module may be configured to, when detecting that there is the wireless frame currently being transmitted on the working channel, determine that the apparatus can receive the wireless frame sent by the first receiver and can know a transmitting power of the first receiver and a preset threshold, and determine that the transmitting power of the apparatus is less than or equal to a transmitting power corresponding to a sum of the preset threshold and a path loss.

Herein, the preset threshold is an acceptable interference power of the first receiver, and the first sender obtains the acceptable interference power of the first receiver from the wireless frame sent by the first receiver.

Herein, the path loss is a difference value between the transmitting power of the first receiver and a received power of the received wireless frame sent by the first receiver, and the first sender obtains the transmitting power of the first receiver from the wireless frame sent by the first receiver.

In the above apparatus, the determination module may be configured to, when detecting that there is the wireless frame currently being transmitted on the working channel, determine that the apparatus cannot receive the wireless frame sent by the first receiver but can know the transmitting power of the first receiver, and obtain the transmitting power of the first receiver and determine the transmitting power of the apparatus to be a first transmitting power or a second transmitting power.

Herein, the first transmitting power is the transmitting power of the first receiver, and the second transmitting power is less than the first transmitting power.

In the above apparatus, the determination module may be configured to, when detecting that there is the wireless frame currently being transmitted on the working channel, determine that the apparatus cannot receive the wireless frame sent by the first receiver but can know the transmitting power of the first receiver; and detect a wireless frame sent by a second sender for the wireless frame currently being transmitted, and obtain the transmitting power of the first receiver from the wireless frame sent by the second sender and determine the transmitting power of the apparatus to be the first transmitting power or the second transmitting power.

Herein, the wireless frame sent by the second sender carries the transmitting power of the first receiver, and the first transmitting power is the transmitting power of the first receiver, and the second transmitting power is less than the first transmitting power.

In the above apparatus, the determination module may be configured to, when detecting that there is the wireless frame currently being transmitted on the working channel, determine that the apparatus cannot receive the wireless frame sent by the first receiver but can know the transmitting power of the first receiver; and detect the wireless frame sent by the second sender for the wireless frame currently being transmitted, and obtain the transmitting power of the first receiver from the wireless frame sent by the second sender and determine the transmitting power of the apparatus to be the first transmitting power or the second transmitting power.

Herein, the wireless frame sent by the second sender carries identification information of the first receiver, and the first transmitting power is the transmitting power of the first receiver, and the second transmitting power is less than the first transmitting power.

In the above apparatus, the determination module may be configured to, when detecting that there is the wireless frame currently being transmitted on the working channel, determine that the apparatus cannot receive the wireless frame sent by the first receiver but can know the transmitting power of the first receiver, and detect the wireless frame sent by the second sender for the wireless frame currently being transmitted, and obtain address information of the first receiver from the wireless frame sent by the second sender, and search an surrounding station information list of the apparatus for the transmitting power corresponding to the obtained address information of the first receiver, and determine transmitting power of the apparatus to be the first transmitting power or the second transmitting power.

Herein, the first transmitting power is the transmitting power of the first receiver, and the second transmitting power is less than the first transmitting power.

In the above apparatus, the determination module may be configured to, when detecting that there is the wireless frame currently being transmitted on the working channel, determine that the apparatus cannot receive the wireless frame sent by the first receiver and cannot know the transmitting power of the first receiver, and determine transmitting power of the apparatus to be a preset transmitting power.

In the above apparatus, the determination module may be configured to, when detecting that there is the wireless frame currently being transmitted on the working channel, determine that the apparatus can receive the wireless frame sent by the first receiver but cannot know the transmitting power of the first receiver, and set a local network allocation vector (NAV) according to the currently transmitted wireless frame.

In the above apparatus, the sending module may be configured to, send a request frame to the second receiver with the determined transmitting power, and receive a response frame from the second receiver, and transmit data to the second receiver during duration time of the wireless frame currently being transmitted with the determined transmitting power.

People having ordinary skill in the art can understand that all or part of steps in the embodiments described above can be carried out by the related hardware (such as processor) through programs, and the programs can be stored in a computer readable storage medium, such as an only read memory, a magnetic disk or an optical disk or the like. In an exemplary embodiment, all or part of steps in the embodiments described above may also be carried out by using one or more integrated circuits. Accordingly, various modules/units in the embodiments may be implemented in the form of hardware or software functional module. The present disclosure is not limited to the combination of any specific form of hardware and software.

It should be noted that the embodiments described above only make the present disclosure to be understood by those skilled in the art more easily, and are not intended to limit the protection scope of the present disclosure. Any obvious substitution and improvement made to the embodiments of the present disclosure by those skilled in the art should fall in the protection scope of the present disclosure without departing from the inventive concept of the present disclosure.

INDUSTRIAL APPLICABILITY

Compared to the existing art, in the scheme of the embodiments of the present disclosure, when detecting that there is a wireless frame currently being transmitted on a working channel, the first sender estimates a signal attenuation between the first sender and a first receiver for the wireless frame currently being transmitted to obtain an estimation result, and determine the transmitting power of the first sender according to the estimation result; and the first sender sends the wireless frame to a second receiver with the determined transmitting power. Through the scheme of the embodiments of the present disclosure, the first sender determines the transmitting power of the first sender according to the estimation result, decreasing interference caused by inequality of transmitting powers during multiplexing transmission.

I claim:

1. A method for transmitting data, comprising:
   detecting, by a first sender, that there is a first wireless frame currently being transmitted on a working channel, wherein the first wireless frame currently being transmitted is from a second sender to a first receiver or is from the first receiver to the second sender;
   determining, by the first sender, that a transmitting power of the first sender is less than or equal to a transmitting power corresponding to a sum of a preset threshold and a path loss; wherein the preset threshold is an acceptable interference power of the first receiver, the path loss is a difference value between a transmitting power of the first receiver and a received power of a wireless frame sent by the first receiver and received by the first sender; and
   sending, by the first sender, a wireless frame to a second receiver with the determined transmitting power.

2. The method according to claim 1, wherein before determining, by the first sender, that a transmitting power of the first sender is less than or equal to a transmitting power corresponding to a sum of a preset threshold and a path loss, the method further comprises:
   determining, by the first sender, that the first wireless frame currently being transmitted is not transmitted between stations in a basic service set, BSS, in which the first sender is located.

3. The method according to claim 1, wherein time for which the first sender sends the wireless frame to the second receiver with the determined transmitting power is less than or equal to duration time of the first wireless frame currently being transmitted.

4. The method according to claim 1, wherein the first wireless frame sent by the first receiver carries the transmitting power of the first receiver and the preset threshold.

5. The method according to claim 1, wherein the first wireless frame sent by the second sender carries the transmitting power of the first receiver.

6. The method according to claim 1, wherein before the first sender sends the wireless frame to the second receiver with the determined transmitting power, the method further comprises:
   sending, by the first sender, a request frame to the second receiver with the determined transmitting power; and
   receiving a response frame from the second receiver.

7. An apparatus for transmitting data comprising a processor and memory storing instructions which, when being implemented by the processor, enable the processor to:
   when detecting that there is a first wireless frame currently being transmitted on a working channel, determine that a transmitting power of the apparatus is less than or equal to a transmitting power corresponding to a sum of a preset threshold and a path loss; wherein the first wireless frame currently being transmitted is from a second sender to a first receiver or is from the first receiver to the second sender, the preset threshold is an acceptable interference power of the first receiver, the path loss is a difference value between a transmitting power of the first receiver and a received power of a wireless frame sent by the first receiver and received by the first sender; and
   send a wireless frame to a second receiver with the determined transmitting power.

8. The apparatus according to claim 7, wherein the processor is further configured to:
   when detecting that there is the first wireless frame currently being transmitted on the working channel, determine whether the first wireless frame currently being transmitted is not transmitted between stations in a basic service set, BSS, in which the apparatus is located, if yes, determine that the transmitting power of the apparatus is less than or equal to the transmitting power corresponding to the sum of the preset threshold and the path loss.

9. The apparatus according to claim 7, wherein the processor is further configured to:
   send a request frame to the second receiver with the determined transmitting power, and receive a response frame from the second receiver, and transmit data to the second receiver during duration time of the first wireless frame currently being transmitted with the determined transmitting power.

* * * * *